United States Patent
Mason

(10) Patent No.: US 11,421,791 B2
(45) Date of Patent: Aug. 23, 2022

(54) TEE UNION BALL DRAIN VALVE

(71) Applicant: NIBCO Inc., Elkhart, IN (US)

(72) Inventor: Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 0 days.

(21) Appl. No.: 17/102,669

(22) Filed: Nov. 24, 2020

(65) Prior Publication Data

US 2022/0163125 A1    May 26, 2022

(51) Int. Cl.
*F16K 11/087*    (2006.01)
*F16K 5/06*    (2006.01)
*F16K 27/06*    (2006.01)

(52) U.S. Cl.
CPC ........ *F16K 11/0873* (2013.01); *F16K 5/0605* (2013.01); *F16K 27/065* (2013.01); *F16K 27/067* (2013.01)

(58) Field of Classification Search
CPC .. F16K 11/0873; F16K 5/0605; F16K 27/067; Y10T 137/87877; Y10T 137/8782
USPC .......................................................... 137/883
See application file for complete search history.

(56) References Cited

U.S. PATENT DOCUMENTS

| 6,460,563 B2 * | 10/2002 | Olson | A01G 25/16 137/364 |
| 7,363,935 B2 * | 4/2008 | Anderson | F16K 11/0876 137/271 |
| 7,631,662 B2 * | 12/2009 | Reck | F16K 5/0605 137/625.47 |
| 7,681,596 B2 | 3/2010 | Reck | |
| 8,375,991 B2 * | 2/2013 | Erhardt | F24H 9/122 137/625.47 |
| 2004/0124386 A1 * | 7/2004 | Carey | F16K 27/067 251/148 |
| 2010/0252129 A1 * | 10/2010 | Olsen | F16K 24/02 137/597 |
| 2011/0073201 A1 * | 3/2011 | Matsui | F16K 27/067 137/561 R |

FOREIGN PATENT DOCUMENTS

| CN | 203395270 | 1/2014 |
| CN | 106958670 | 7/2017 |
| JP | 2020097902 | 6/2020 |

OTHER PUBLICATIONS

The Plumber's Choice, "1-1/4 in x 2 in SWT high flow drain ball valve, purge for pipe cleanout, 3-way adjustable flow path, brass," https://www.homedepot.com/p/The-Plumber-s-Choice . . . (Oct. 9, 2020).
Watts, "Series RPVM1-Press residential purge" flier, Watts.com (© 2020 Watts).
Webstone, "Propal Series" Ball Drain Valve brochure, Webstone Company, Inc. (© 2016 Webstone).

* cited by examiner

*Primary Examiner* — Michael R Reid
(74) *Attorney, Agent, or Firm* — Price Heneveld LLP

(57) ABSTRACT

A tee union ball drain valve member utilizes a first valve member and a second valve member. The first valve member is positioned at the intersection of the third passageway of the valve body and the drain path. The second valve member is located in the drain path. The valve body is coupled to a tee union. The first valve member and second valve member permit draining of the valve body.

20 Claims, 8 Drawing Sheets

TEE UNION BALL DRAIN VALVE

BACKGROUND OF THE INVENTION

The present invention relates to a tee union ball drain valve. Valves incorporating drains are well known and can be used to drain all or part of the plumbing components near the valve. Drain valves can be used in a variety of plumbing applications including, but not limited to, hydronic heating and potable plumbing systems to build header/branch assemblies that allow for quick assembly and isolation/disconnection/draining/purging/filling capabilities of the branch line by combining several fitting and valve connections. Typically, the drain valves that were incorporated above a tee union permitted draining either above or below the valve by a drain segment that was positioned, as a separate component, above or below the drain valve. A number of components are typically necessary to couple a drain, a valve, and a tee union together to piping leading to and from the valve. This typically includes at least one segment of piping in between the drain, valve, and tee union and/or additional other components. This creates additional leak paths, takes additional time to assemble, and takes space given the number of components.

An improved assembly that eliminates a number of potential leak paths while saving assembly time, labor, and space is described herein.

SUMMARY OF THE INVENTION

One aspect of the present invention is a valve assembly. The valve assembly includes a valve body having a fluid passageway between a fitting end and a union end of the valve body. A drain path is located in the valve body between the fluid passageway and a drain port. The valve assembly includes a first valve member located at the intersection of the fluid passageway and the drain path. The first valve member will open the fluid passageway between the fitting end and the union end of the valve body, while closing the fluid passageway from the drain path when the first valve member is in a first position. When the first valve member is in a second position, the fluid passageway between the fitting end and the union end is closed, while the fluid passageway from the fitting end is opened to the drain path. When the first valve member is in a third position, the fluid passageway between the fitting end and the union end is closed, while the fluid passageway between the union end and the drain path is opened. The valve assembly includes a second valve member located in the drain path between the first valve member and the drain port. The valve assembly includes a tee body with a union end, a first fitting end, and a second fitting end. A coupling member couples the union end of the valve body and the union end of the tee body together. At least one seal member is located between the union end of the valve body and the union end of the tee body.

Another aspect of the present invention is a tee union ball drain valve. The tee union ball drain valve includes a valve body having a fluid passageway between a fitting end and a union end. The drain path is oriented at approximately a 90° angle from the fluid passageway and connects the fluid passageway to a drain port. A first valve member is located at the intersection of the fluid passageway and the drain path. A second valve member is located in the drain path between the first valve member and the drain port. The tee union ball drain valve includes a tee body with a union end, a first fitting end, and a second fitting end. A coupling member couples the union end of the valve body and the union end of the tee body. At least one seal member is located between the union end of the valve body and the union end of the tee body.

Yet another aspect of the present invention is a piping system utilizing the tee union ball drain valve. The tee union ball drain valve includes a valve body having a fluid passageway between a fitting end and a union end. A drain path is oriented at approximately a 90° angle from the fluid passageway and connects the fluid passageway to a drain port. The tee union ball drain valve includes a first valve member located at the intersection of the fluid passageway and the drain path. A tee body with a union end, a first fitting end, and a second fitting end is coupled to the valve body by a coupling member that couples the union end of the valve body and the union end of the tee body. At least one seal member is located between the union end of the valve body and the union end of the tee body. The piping system includes a first pipe coupled to the fitting end on a valve body, a second pipe coupled to the first fitting end of the tee body, and a third pipe coupled to the second fitting end of the tee body.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in FIGS. 1-11. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment.

Figure 3:
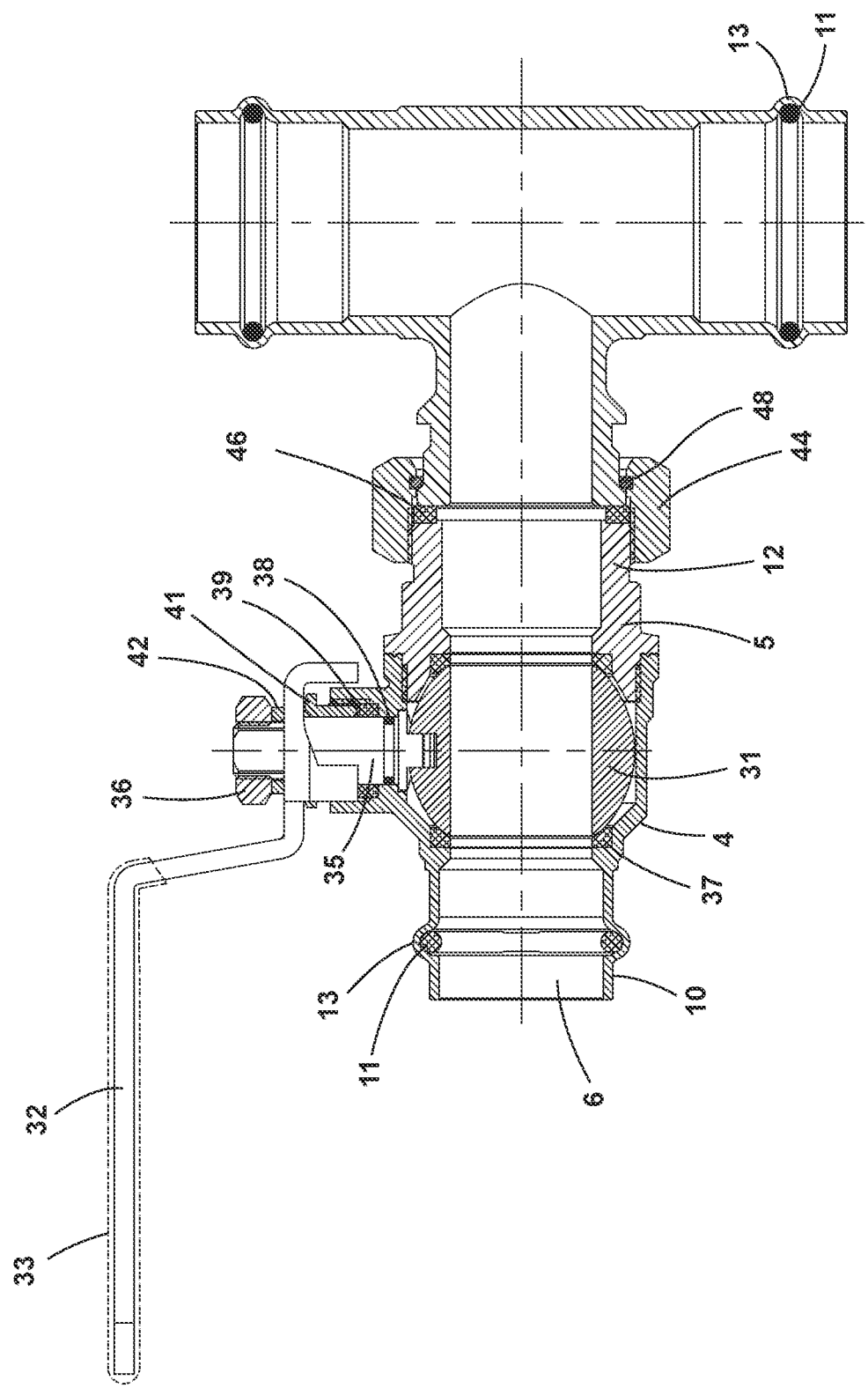
FIG. 3 is a cross-sectional view of the tee union ball drain valve shown in FIG. 1.

By way of overview, the present invention is generally directed to a tee union ball drain valve 2. The tee union ball drain valve 2 has a valve body 4 that has a fluid passageway 6 that extends between the fitting end 10 and a union end 12 of the valve body 4. The union end 12 can be integrally formed as part of the valve body 4 or can be a separate bonnet 5 that is connected to the valve body 4, as illustrated in FIG. 3. The fitting end 10 of the valve body 4 can be any type of fitting end. The fitting end 10 in the illustrated embodiments is a press-fit end that includes a compressible O-ring 11 that is held within an O-ring retention area 13 on fitting end 10. Other types of fittings, including, but not limited to, male pipe thread, female pipe thread, push-to-connect, fusion, PEX, press-to-connect, traditional solder connection, etc. can be utilized for the fitting end 10.

Figure 4:
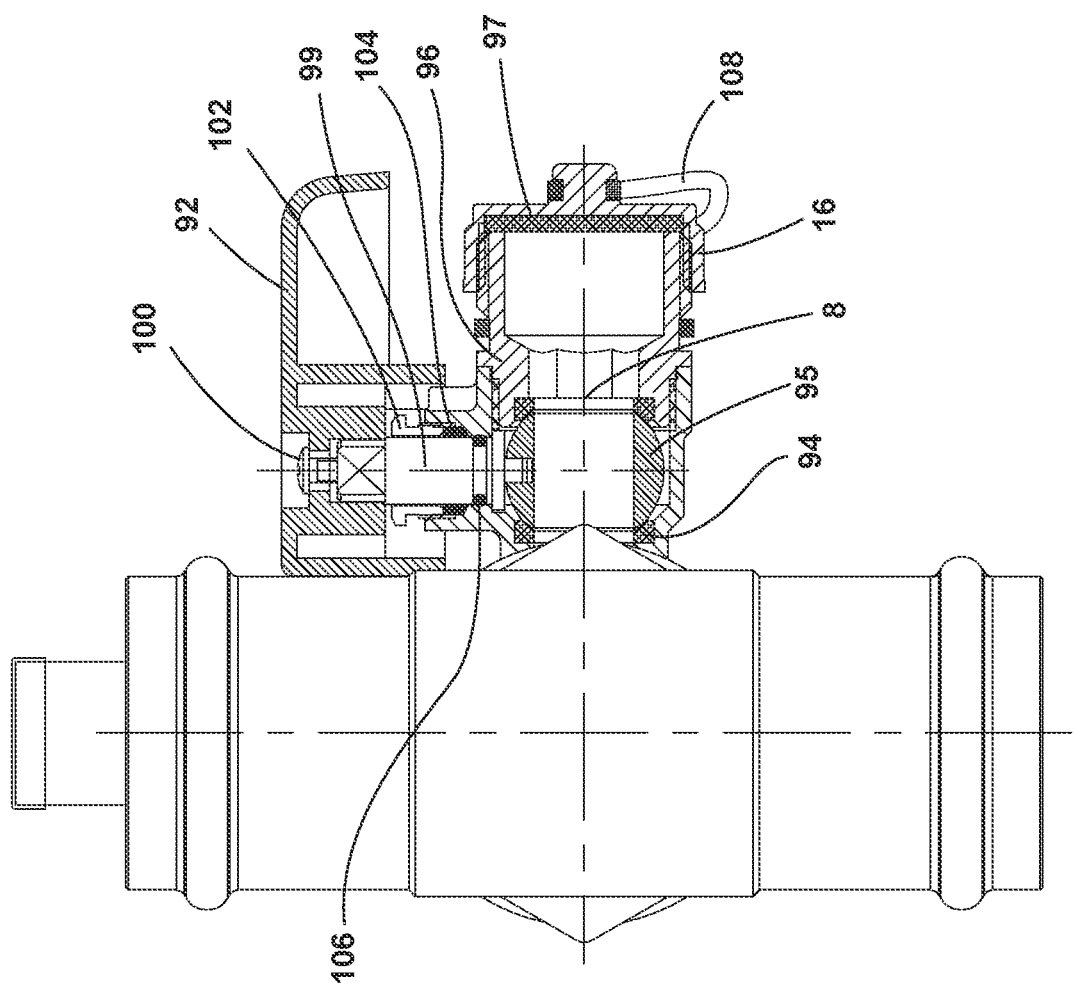
FIG. 4 is a bottom view including a partial cross section of the drain port of the tee union ball drain valve shown in FIG. 1.
Figure 5:
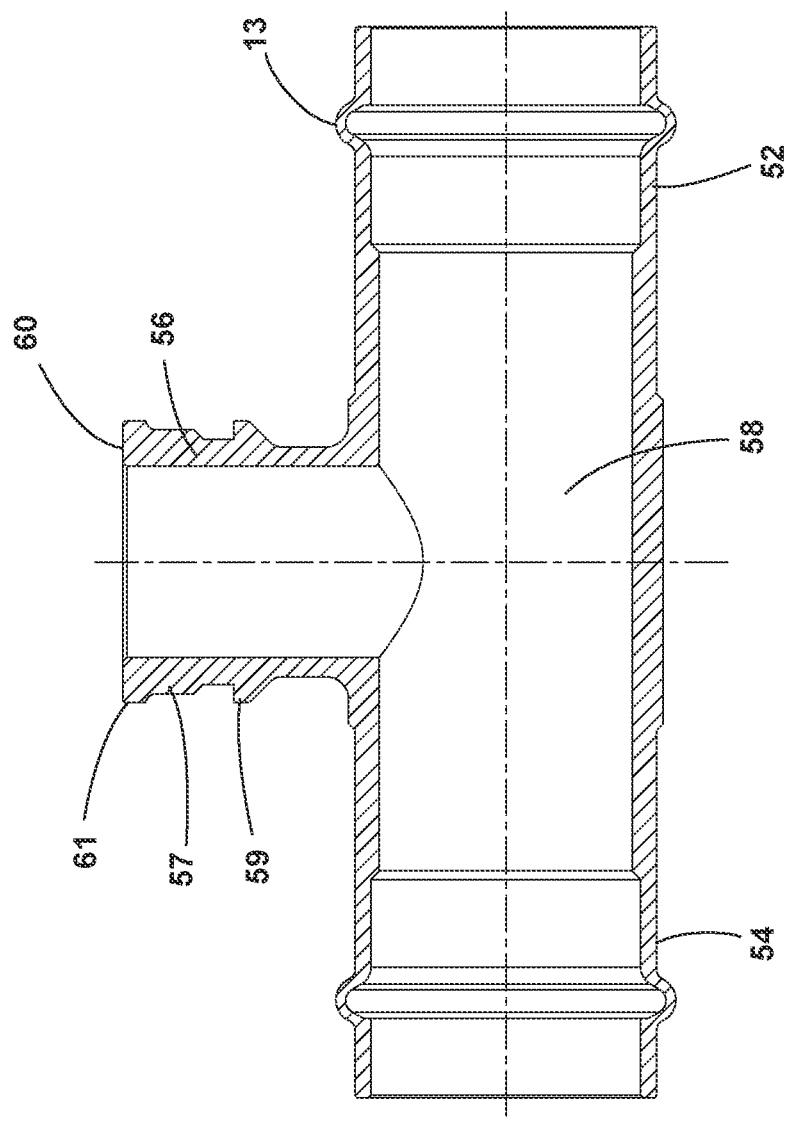
FIG. 5 is cross-sectional view of the tee body of the tee union ball drain valve shown in FIG. 1.

The valve body 4 includes a drain port 14. The drain port 14 is in fluid communication with the fluid passageway 6 of the valve body 4 by drain path 8. In the illustrated embodiment, drain path 8 is at approximately a 90° angle to the fluid passageway 6. However, other orientations of the drain path 8 to the fluid passageway 6 can be utilized. The drain port 14 includes a cap 16 that be connected by a tie 108, as illustrated in FIG. 4. The cap 16 can also have a washer 97 that seals the cap 16 to the drain port 14.

The union end 12 of valve body 4 is configured to be coupled to a tee body 50. The tee body 50 includes a first fitting end 52, a second fitting end 54, and a union end 56. The first fitting end 52 and the second fitting end 54 can be any type of fitting end, including, but not limited to, press-fit, male pipe thread, female pipe thread, push-to-connect, press-to-connect, PEX, fusion, solder, etc. The union end 56 can include a plurality of tiered surfaces 57, 59, 61 that help couple the union end 56 of tee body 50 to the union end 12 of valve body 4. In the illustrated embodiments, the coupling of union end 56 and union end 12 is done by a coupling member 40 that compresses a seal member 46 that is positioned between the union end 12 of valve body 4 and the union end 56 of tee body 50. The seal member 46 can be a polymeric washer or any other compressible member that helps seal the connection. In addition, a clip spring 48 is utilized to secure the coupling member 40 in the arrangement on the union end 56 of tee body 50. The coupling member 40 permits the leak proof coupling of the union end 12 of valve body 4 and the union end 56 of tee body 50. In addition, the coupling member 40 permits the rotation of the valve body 4 with respect to the tee body 50. This can be important when there is limited space to access the handle 32 of the first valve member 30 and/or the handle 92 of the second valve member 90.

The first valve member 30 is located in the intersection of the fluid passageway 60 of valve body 4 and the drain path 8 of drain port 14. The first valve member 30 includes a ball 31 that is positioned within the fluid passageway 6 by seat seals 37, as illustrated in FIG. 3. The ball 31 is connected to a stem 35. Stem seal 38 and stem packing 39 help seal the stem 35 with respect to the valve body 4. Handle 32 is coupled to stem 35 by nut 41 in conjunction with lock nut 36, as illustrated in FIG. 3. A washer 42 can be positioned between the lock nut 36 and the handle 32, as illustrated in FIG. 3. The handle 32 can also have an optional coating or cover 33.

The first valve member 30 is designed to permit different flow conditions. For example, when the first valve member 30 is in a first position, the fluid passageway 6 between the fitting end 10 and the union end 12 will be open, while the fluid passageway 6 will be closed with respect to drain path 8. When the first valve member 30 is in a second position, the fluid passageway 6 will be closed between the fitting end 10 and the union end 12, while the fluid passageway 6 from the fitting end 10 to the drain path 8 will be open. When the first valve member 30 is in a third position, the fluid passageway 6 between fitting end 10 and the union end 12 of the valve body 4 will be closed, while the fluid passageway 6 between the union end 12 of the valve body 4 and the drain path 8 will be open. While this arrangement describes three different flow paths of the illustrated embodiments, the paths can be changed by removing and reversing the handle 32 on the first valve member 30. Thus, in the illustrated embodiment, the draining can be done laterally from the first valve member 30, permitting draining from above the first valve member 30, and draining from below the first valve member 30. A differing orientation of the handle 32 with respect to the ball 31 and/or the shape of the openings in the ball 31 can create different drain options. Moreover, while the first valve member 30 is a T-ball valve in the illustrated embodiments, other types of valves can be utilized that create different draining pathways.

A second valve member 90 is positioned in the drain path 8 between the first valve member 30 and the drain port 14. The second valve member 90 has a ball 95 that is positioned in drain path 8 by seat seal 94. The second valve member 90 also has a stem 99 that is sealed with respect to the valve body 4 by O-ring 106 and stem packing 104. A coupling member 102 can be used between the handle 92 and the stem packing 104. A fastener 100 can be used to couple the handle 92 to the stem 99, as illustrated in FIG. 4.

The drain port 14 can be a separate bonnet 96, as illustrated in FIG. 4, or can be integrally formed as part of valve body 4.

The second valve member 90 can open or close the drain path 8 between the first valve member 30 and the drain port 14. Thus, when the first valve member 30 is in its second or third position, as described above, the opening of the second valve member 90 can drain the assembly.

Figure 7:
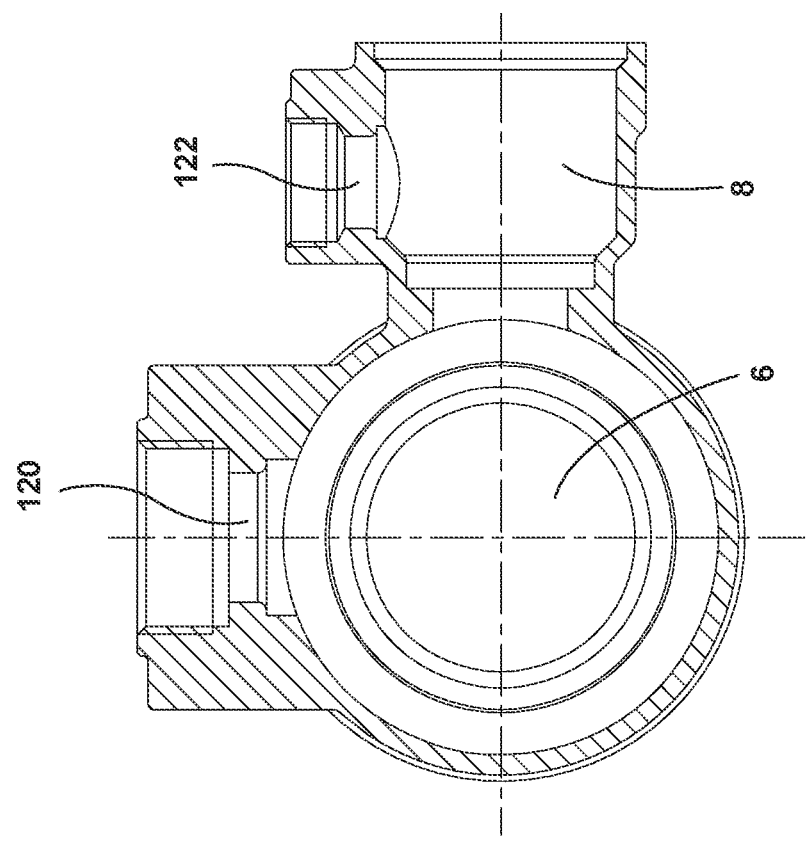
FIG. 7 is a cross-sectional view of the valve body of the tee union ball drain valve taken along lines VII-VII.
Figure 6:
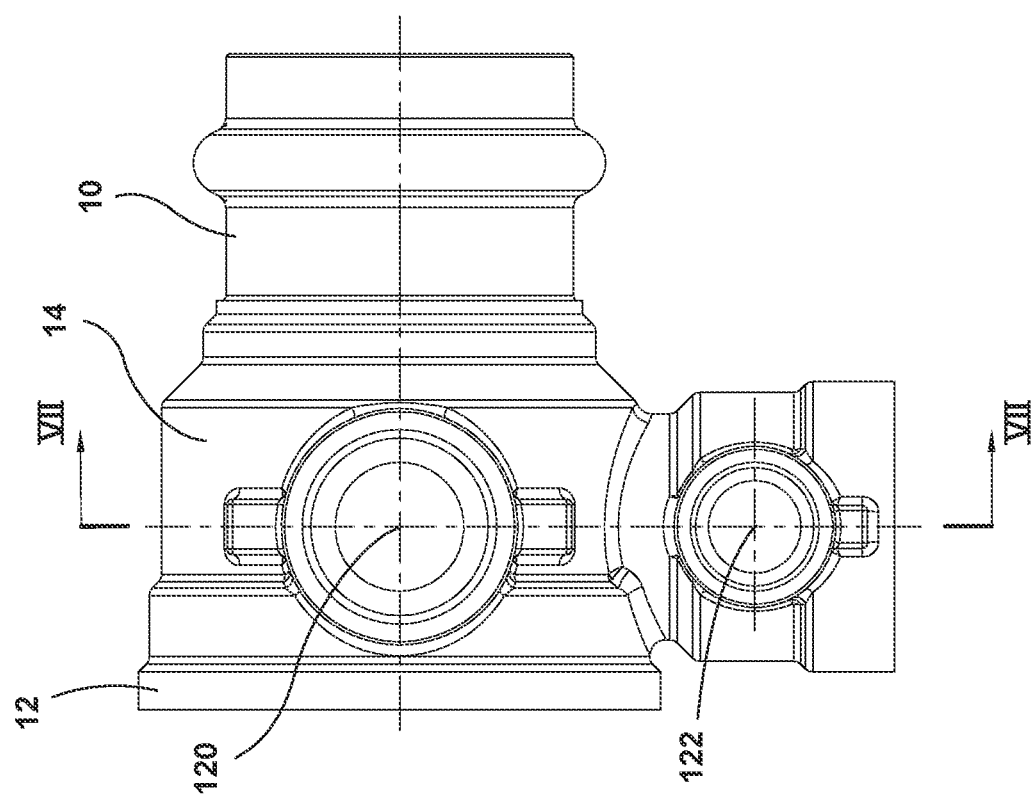
FIG. 6 is side view of the valve body of the tee union ball drain valve shown in FIG. 1.
Figure 9:
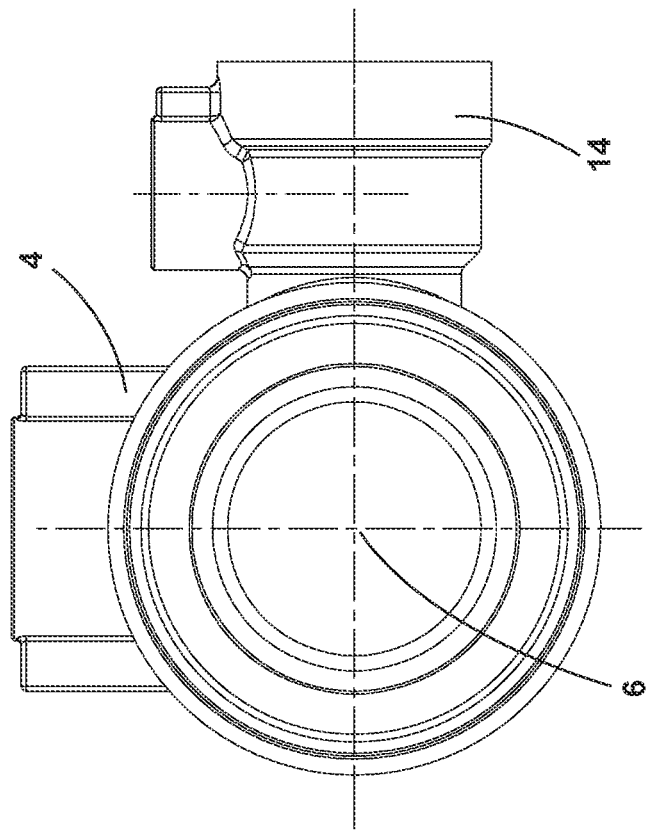
FIG. 9 is a bottom view of the valve body of the tee union ball drain valve shown in FIG. 1.
Figure 8:
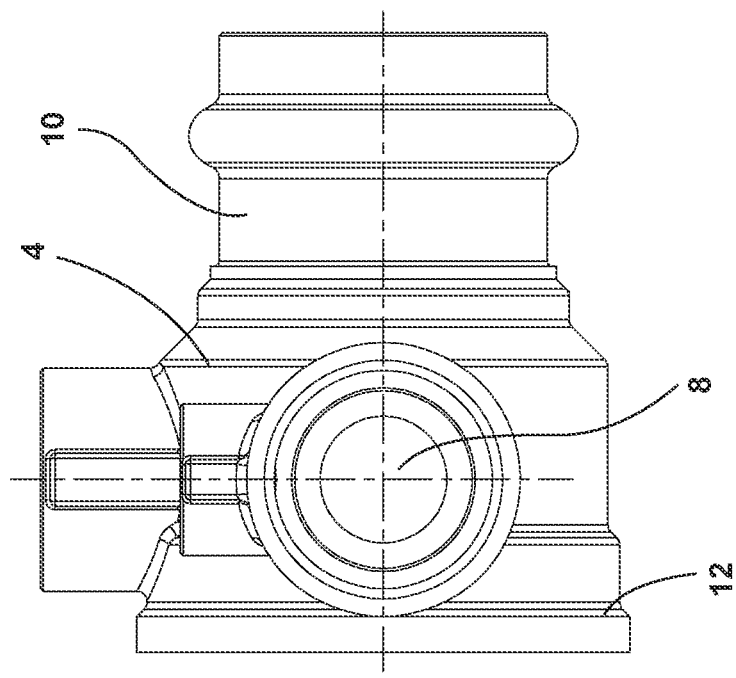
FIG. 8 is a front view of the valve body of the tee union ball drain valve shown in FIG. 1.
Figure 11:
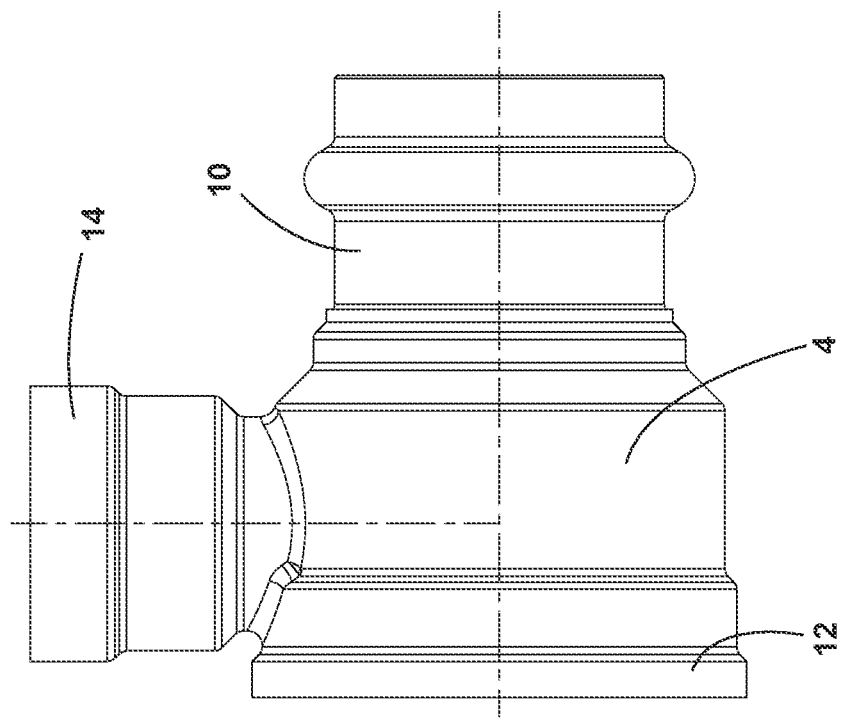
FIG. 11 is a rotated side view of the valve body of the tee union ball drain valve shown in FIG. 1.
Figure 10:
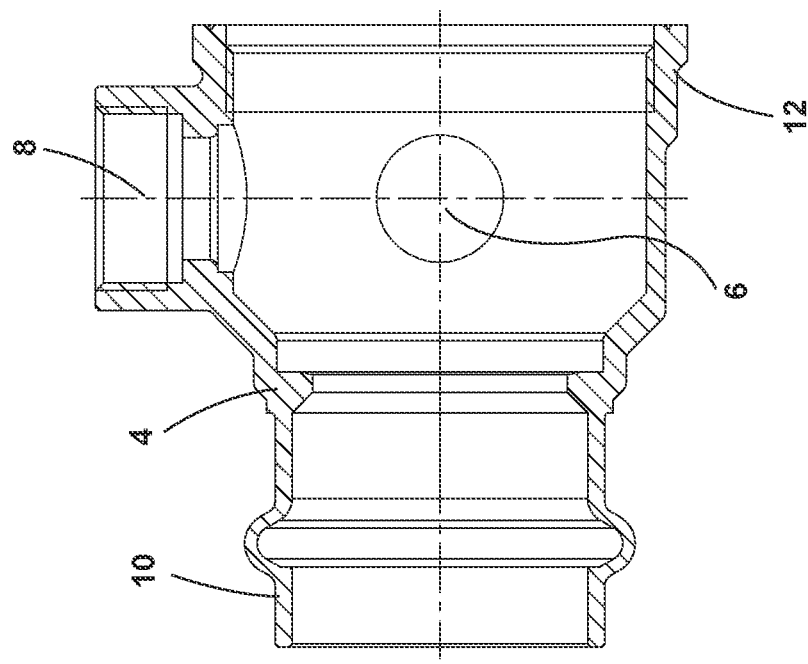
FIG. 10 is a rotated side cross-sectional view of the valve body of the tee union ball drain valve shown in FIG. 1.

The opening 120 for the first valve member 30 and the opening 122 for the second valve member 90 in valve body 4 are illustrated in FIGS. 6 and 7. The positioning of the openings 120, 122 can vary depending upon the desired location of the drain port 14.

Figure 1:
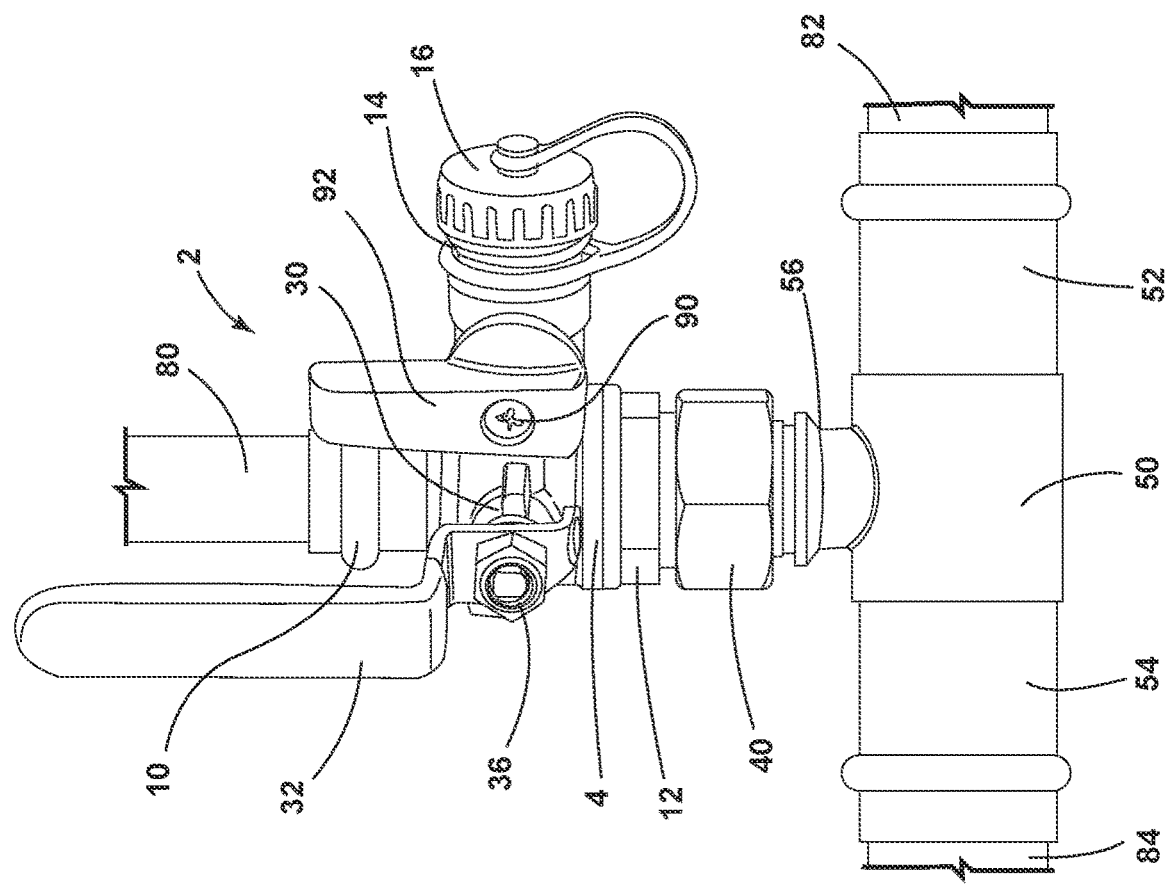
FIG. 1 is a front view of a tee union ball drain valve according to one embodiment of the present invention.
Figure 2:
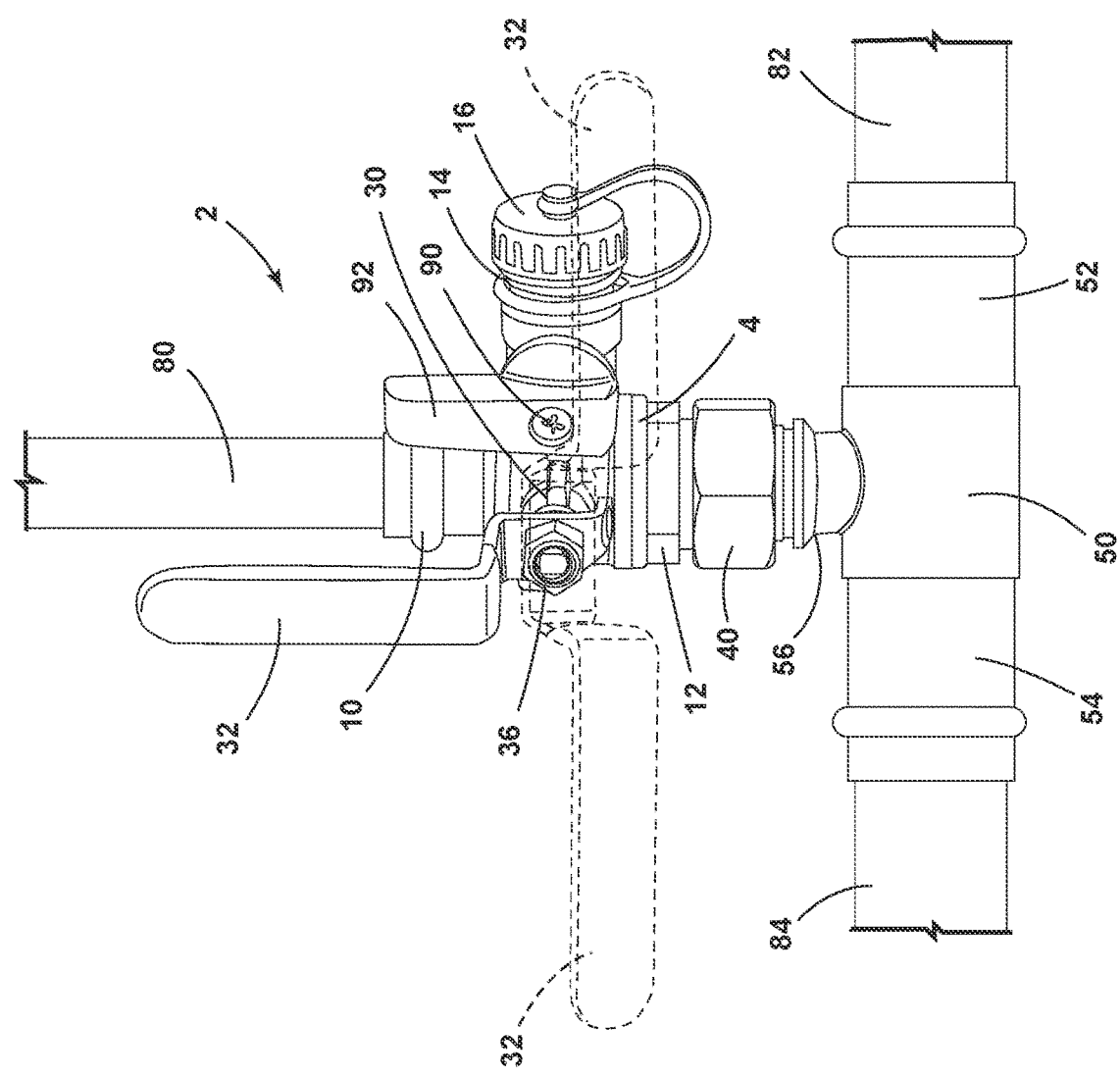
FIG. 2 is a front view of the tee union ball drain valve shown in FIG. 1 with the alternate handle positions shown.

In the illustrated embodiments of FIGS. 1 and 2, a first pipe 80 is coupled to the fitting end 10 of the valve body 4. A second pipe 82 is coupled to the first fitting end 52 of tee body 50. A third pipe 84 is coupled to the second fitting end 54 of tee body 50. In the illustrated embodiments, the second pipe 82 and third pipe 84 are approximately the same diameter. However, the first pipe 80 is a smaller diameter. The tee union ball drain valve 2 can thus act as a reducing plumbing fitting, where a different diameter pipes are used. While the illustrated embodiments illustrate the first pipe 80 being smaller than the second pipe 82 and the third pipe 84, any of the pipes (80, 82, 84) can be of a different size.

Moreover, the pipes (80, 82, 84) can be of different materials, depending upon the type of connection used on the fitting (10, 52, 54).

The tee union ball drain valve 2 permits the draining of the tee union ball drain valve 2 horizontally, as illustrated in FIGS. 1 and 2. This permits the tee union ball drain valve 2 to be used in a more compact space in comparison to other assemblies where a separate drain is assembled vertically within the assembly of components.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated. In addition, while certain embodiments have shown threaded connections, the threaded connections could include tape or other sealing material in the threaded connection. In addition, the threaded connection could be replaced by other suitable connections or couplings, such as compression couplings or other couplings.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the afore-mentioned structures and methods without departing from the concepts of the present invention, and further it is to be understood that such concepts are intended to be covered by the following claims unless these claims by their language expressly state otherwise.

The invention claimed is:

1. A valve assembly, comprising:
    a valve body having a fluid passageway between a fitting end and a union end of the valve body;
    a drain path in said valve body between said fluid passageway and a drain port;
    a first valve member located at the intersection of said fluid passageway and said drain path in said valve body;
    wherein said first valve member opening said fluid passageway between said fitting end and said union end of the valve body while closing said fluid passageway from said drain path when said first valve member is in a first position;
    said first valve member closing said fluid passageway between said fitting end and said union end of the valve body while opening said fluid passageway from said fitting end to said drain path when said first valve member is in a second position;
    said first valve member closing said fluid passageway between said fitting end and said union end of the valve body while opening said fluid passageway between said union end of the valve body and said drain path when said first valve member is in a third position;
    a second valve member located in said drain path between said first valve member and said drain port;
    a tee body with a union end having a plurality of tiered external surfaces with at least two angled external shoulders formed in between said tiered external surfaces, a first fitting end, and a second fitting end;
    a spring clip coupled to said union end, said spring clip contacting the outermost angled external shoulder of said union end;
    a coupling member that couples said union end of the valve body and said union end of the tee body;
    at least one seal member located between said union end of the valve body and said union end of the tee body; and
    wherein the handles of said first valve member and said second valve member are on the same side of the valve body.

2. The valve assembly of claim 1, wherein said first valve member is a T-ball valve.

3. The valve assembly of claim 2, wherein said second valve member is a ball valve.

4. The valve assembly of claim 1, wherein said fitting end on said valve body is a press fitting.

5. The valve assembly of claim 1, wherein said drain port is in a generally horizontal orientation when said fitting end and said union end are in a generally vertical orientation.

6. The valve assembly of claim 1, wherein said at least one seal member includes a rubber washer.

7. The valve assembly of claim 1, wherein the first fitting end and the second fitting end of said tee body are the same type of fitting.

8. The valve assembly of claim 1, wherein said valve body and said tee body are made from a metallic material.

9. The valve assembly of claim 1, wherein internal diameters of the fitting end of the valve body, the first fitting end of the tee body, and the second fitting end of the tee body are not the same.

10. A tee union ball drain valve, comprising:
- a valve body having a fluid passageway between a fitting end and a union end of the valve body;
- a drain path oriented at approximately a 90° angle from said fluid passageway that connects said fluid passageway to a drain port;
- a first valve member located at the intersection of said fluid passageway and said drain path in said valve body;
- wherein said first valve member opening said fluid passageway between said fitting end and said union end of the valve body while closing said fluid passageway from said drain path when said first valve member is in a first position;
- said first valve member closing said fluid passageway between said fitting end and said union end of the valve body while opening said fluid passageway from said fitting end to said drain path when said first valve member is in a second position;
- said first valve member closing said fluid passageway between said fitting end and said union end of the valve body while opening said fluid passageway between said union end of the valve body and said drain path when said first valve member is in a third position;
- a second valve member located in said drain path between said first valve member and said drain port;
- a tee body with a union end having a plurality of tiered external surfaces with at least two angled external shoulders formed in between said tiered external surfaces, a first fitting end, and a second fitting end;
- a spring clip coupled to said union end, said spring clip contacting the outermost angled external shoulder of said union end;
- a coupling member that couples said union end of the valve body and said union end of the tee body;
- at least one seal member located between said union end of the valve body and the union end of the tee body; and
- wherein the handles of said first valve member and said second valve member are on the same side of said valve body.

11. The tee union ball drain valve of claim 10, wherein said first valve member is a T-ball valve.

12. The tee union ball drain valve of claim 10, wherein said seal member is a compressible washer.

13. The tee union ball drain valve of claim 10, wherein said drain port includes a removable cap.

14. A piping system with a tee union ball drain valve, comprising:
- a valve body having a fluid passageway between a fitting end and a union end of the valve body;
- a drain path oriented at approximately a 90° angle from said fluid passageway that connects the fluid passageway to a drain port;
- a first valve member located at the intersection of said fluid passageway and said drain path;
- wherein said first valve member opening said fluid passageway between said fitting end and said union end of the valve body while closing said fluid passageway from said drain path when said first valve member is in a first position;
- said first valve member closing said fluid passageway between said fitting end and said union end of the valve body while opening said fluid passageway from said fitting end to said drain path when said first valve member is in a second position;
- said first valve member closing said fluid passageway between said fitting end and said union end of the valve body while opening said fluid passageway between said union end of the valve body and said drain path when said first valve member is in a third position;
- a tee body with a union end having a plurality of tiered external surfaces with at least two angled external shoulders formed in between said tiered external surfaces, a first fitting end, and a second fitting end;
- a spring clip coupled to said union end, said spring clip contacting the outermost angled external shoulder of said union end;
- a coupling member that couples said union end of the valve body and said union end of the tee body;
- at least one seal member located between said union end of the valve body and the union end of the tee body;
- a first pipe coupled to said fitting end on the valve body;
- a second pipe coupled to said first fitting end of said tee body; and
- a third pipe coupled to said second fitting end of said tee body.

15. The piping system utilizing a tee union ball drain valve of claim 14, including a second valve member located in said drain path between said first valve member and said drain port.

16. The piping system utilizing a tee union ball drain valve of claim 14, wherein at least one of said first pipe, said second pipe, and said third pipe has a different diameter.

17. The piping system utilizing a tee union ball drain valve of claim 14, wherein said coupling member is a nut.

18. The piping system utilizing a tee union ball drain valve of claim 14, wherein said first valve member is a T-ball valve.

19. The piping system utilizing a tee union ball drain valve of claim 14, wherein said valve body is a unitary piece of metal.

20. The piping system utilizing a tee union ball drain valve of claim 14, wherein said at least one seal member is a compressed seal.

* * * * *